United States Patent
Gee

(10) Patent No.: US 8,904,774 B2
(45) Date of Patent: Dec. 9, 2014

(54) HYDRAULIC-BASED ROTATIONAL SYSTEM FOR SOLAR CONCENTRATORS THAT RESISTS HIGH WIND LOADS WITHOUT A MECHANICAL LOCK

(75) Inventor: Randall C. Gee, Arvada, CO (US)

(73) Assignee: Skyfuel, Inc., Arvada, CO (US)

( * ) Notice: Subject to any disclaimer, the term of this patent is extended or adjusted under 35 U.S.C. 154(b) by 1014 days.

(21) Appl. No.: 12/544,910

(22) Filed: Aug. 20, 2009

(65) Prior Publication Data

US 2010/0043776 A1 Feb. 25, 2010

Related U.S. Application Data

(60) Provisional application No. 61/091,254, filed on Aug. 22, 2008.

(51) Int. Cl.
  *F24J 2/54* (2006.01)
  *F24J 2/38* (2014.01)
  *F24J 2/40* (2006.01)
  *F24J 2/46* (2006.01)

(52) U.S. Cl.
  CPC *F24J 2/5403* (2013.01); *F24J 2/38* (2013.01); *F24J 2/40* (2013.01); *F24J 2/463* (2013.01); *F24J 2002/5441* (2013.01); *F24J 2002/5496* (2013.01); *Y02E 10/47* (2013.01)
  USPC ............................. 60/329; 60/468

(58) Field of Classification Search
  CPC ..... F24J 2/4607; F24J 2/54; F24J 2002/5441; F15B 2211/8623; F15B 2211/8752; Y02E 10/47
  USPC ........................ 91/420; 60/329, 468; 126/570
  See application file for complete search history.

(56) References Cited

U.S. PATENT DOCUMENTS

| | | | |
|---|---|---|---|
| 670,916 | A | 3/1901 | Eneas |
| 670,917 | A | 3/1901 | Eneas |

(Continued)

FOREIGN PATENT DOCUMENTS

| | | | |
|---|---|---|---|
| AT | 0321919 | E | 4/2006 |
| AT | 0448369 | E | 11/2009 |

(Continued)

OTHER PUBLICATIONS

Automation Direct (downloaded Aug. 23, 2010) "GS2 Series Specifications" Drives/Motors/Motion vol. 13, e13-22 http://www.automationdirect.com/adc/Shopping/Catalog/Drives/GS2__(115_-z-_230_-z-_460_-z-_575_VAC_V-z-Hz_Control)/GS2_Drive_Units_(115_-z-_230_-z-_460_-z-_575_VAC)/GS2-11P0.

(Continued)

*Primary Examiner* — F. Daniel Lopez
(74) *Attorney, Agent, or Firm* — Lathrop & Gage LLP

(57) ABSTRACT

A rotational system is provided for controlling rotation of one or more solar collectors to track the movement of the sun, to automatically keep the collectors locked in stow position during high wind conditions, and advantageously also to prevent damage to the rotational system due to high pressures caused by high temperature conditions. The system utilizes a bi-directional hydraulic rotational actuator hydraulically connected to a control system. The actuator advantageously includes a system of helical gears and a piston, and the control system includes hydraulic lines equipped with check valves that prevent circulation of hydraulic fluid through the hydraulic lines and the actuator when backpressure is exerted in one of the hydraulic lines as a result of high wind force on the collectors. In addition, the control system advantageously comprises a pressure-relief system to prevent damage to the actuator during high temperature conditions. A single actuator can be used to operate up to sixteen or more large solar collectors.

17 Claims, 9 Drawing Sheets

(56) References Cited

U.S. PATENT DOCUMENTS

| | | | |
|---|---|---|---|
| 1,092,503 A | 4/1914 | Moore | |
| 1,760,883 A | 6/1930 | Moss | |
| 1,792,489 A | 2/1931 | Gilmore | |
| 2,657,533 A * | 11/1953 | Schanzlin et al. | 60/329 |
| 2,955,955 A | 10/1960 | Orr | |
| 3,070,923 A | 1/1963 | Fellman | |
| 3,187,592 A | 6/1965 | Geyer | |
| 3,459,234 A | 8/1969 | Richter et al. | |
| 3,463,527 A | 8/1969 | Baker | |
| 3,511,134 A | 5/1970 | Wittren | |
| 3,548,866 A | 12/1970 | Kaiser et al. | |
| 3,559,534 A | 2/1971 | Munro | |
| 3,564,783 A | 2/1971 | Dunne | |
| 3,668,754 A | 6/1972 | Boast | |
| 3,775,226 A | 11/1973 | Windorf | |
| 3,861,379 A | 1/1975 | Anderson | |
| 3,872,854 A | 3/1975 | Raser | |
| 3,946,532 A | 3/1976 | Gilb | |
| 4,031,444 A | 6/1977 | Back, Jr. | |
| 4,031,879 A | 6/1977 | Parham | |
| 4,069,635 A | 1/1978 | Gilb | |
| 4,069,812 A | 1/1978 | O'Neill | |
| 4,077,176 A | 3/1978 | Bauer | |
| 4,078,549 A | 3/1978 | McKeen et al. | |
| 4,119,365 A | 10/1978 | Powell | |
| 4,126,993 A | 11/1978 | Grattapaglia et al. | |
| 4,127,926 A | 12/1978 | White | |
| 4,141,626 A | 2/1979 | Treytl et al. | |
| 4,146,785 A | 3/1979 | Neale | |
| 4,158,356 A | 6/1979 | Wininger | |
| 4,159,710 A | 7/1979 | Prast | |
| 4,161,905 A | 7/1979 | Ota | |
| 4,178,913 A | 12/1979 | Hutchison | |
| 4,191,164 A | 3/1980 | Kelly | |
| 4,195,620 A | 4/1980 | Rust | |
| 4,211,922 A | 7/1980 | Vaerewyck et al. | |
| 4,215,410 A * | 7/1980 | Weslow et al. | 126/578 |
| 4,226,910 A | 10/1980 | Dahlen et al. | |
| 4,230,763 A | 10/1980 | Skolnick | |
| 4,237,864 A | 12/1980 | Kravitz | |
| 4,269,173 A | 5/1981 | Krueger et al. | |
| 4,293,192 A | 10/1981 | Bronstein | |
| 4,307,150 A | 12/1981 | Roche | |
| 4,313,367 A | 2/1982 | Weyer | |
| 4,313,422 A | 2/1982 | McEntee | |
| 4,318,394 A | 3/1982 | Alexander | |
| 4,328,789 A | 5/1982 | Nelson | |
| 4,343,533 A | 8/1982 | Currin et al. | |
| 4,352,511 A | 10/1982 | Ribble et al. | |
| 4,354,484 A * | 10/1982 | Malone et al. | 126/571 |
| 4,363,354 A | 12/1982 | Strickland | |
| 4,368,962 A | 1/1983 | Hultberg | |
| 4,372,027 A | 2/1983 | Hutchison | |
| 4,373,514 A | 2/1983 | Lois | |
| 4,398,802 A | 8/1983 | Auger et al. | |
| 4,414,254 A | 11/1983 | Iwata et al. | |
| 4,423,719 A | 1/1984 | Hutchison | |
| 4,425,904 A | 1/1984 | Butler | |
| 4,440,150 A | 4/1984 | Kaehler | |
| 4,446,262 A | 5/1984 | Okumura et al. | |
| 4,465,057 A | 8/1984 | Nikkel et al. | |
| 4,487,196 A | 12/1984 | Murphy | |
| 4,493,872 A | 1/1985 | Funderburk et al. | |
| 4,500,970 A | 2/1985 | Daemmer | |
| 4,510,923 A | 4/1985 | Bronstein | |
| 4,523,575 A | 6/1985 | Nikkel et al. | |
| 4,536,847 A | 8/1985 | Erickson et al. | |
| 4,571,812 A | 2/1986 | Gee | |
| 4,577,449 A | 3/1986 | Celli | |
| 4,587,951 A | 5/1986 | Townsend et al. | |
| 4,596,238 A | 6/1986 | Bronstein | |
| 4,597,377 A | 7/1986 | Melamed | |
| 4,604,990 A | 8/1986 | Nikkel et al. | |
| 4,608,964 A | 9/1986 | Russo | |
| 4,611,575 A | 9/1986 | Powell | |
| 4,628,692 A | 12/1986 | Pierce | |
| 4,645,714 A | 2/1987 | Roche et al. | |
| 4,666,263 A | 5/1987 | Petcavich | |
| 4,678,292 A | 7/1987 | Miyatani et al. | |
| 4,710,426 A | 12/1987 | Stephens | |
| 4,719,903 A | 1/1988 | Powell | |
| 4,739,620 A | 4/1988 | Pierce | |
| 4,832,001 A | 5/1989 | Baer | |
| 4,853,283 A | 8/1989 | Skolnick | |
| 4,888,063 A | 12/1989 | Powell | |
| 4,893,183 A | 1/1990 | Nayar | |
| 4,913,468 A | 4/1990 | Rattmann | |
| 4,933,823 A | 6/1990 | Taylor | |
| 5,006,988 A | 4/1991 | Borenstein et al. | |
| 5,013,176 A | 5/1991 | Orbom | |
| 5,018,935 A * | 5/1991 | Gage | 91/420 |
| 5,049,005 A | 9/1991 | Lazare et al. | |
| 5,058,565 A | 10/1991 | Gee et al. | |
| 5,063,112 A | 11/1991 | Gross et al. | |
| 5,069,964 A | 12/1991 | Tolliver et al. | |
| 5,071,243 A | 12/1991 | Bronstein | |
| 5,118,540 A | 6/1992 | Hutchison | |
| 5,136,593 A | 8/1992 | Moon et al. | |
| 5,138,838 A | 8/1992 | Crosser | |
| 5,205,101 A | 4/1993 | Swan et al. | |
| 5,219,264 A | 6/1993 | McClure et al. | |
| 5,228,259 A | 7/1993 | Haddad et al. | |
| 5,237,337 A | 8/1993 | Hutchison et al. | |
| 5,251,064 A | 10/1993 | Tennant et al. | |
| 5,276,600 A | 1/1994 | Takase et al. | |
| 5,285,627 A | 2/1994 | Losel et al. | |
| 5,334,844 A | 8/1994 | Pollard et al. | |
| 5,347,986 A | 9/1994 | Cordy | |
| 5,350,201 A | 9/1994 | Bynum | |
| 5,361,172 A | 11/1994 | Schissel et al. | |
| 5,367,174 A | 11/1994 | Bazile et al. | |
| 5,398,462 A | 3/1995 | Berlin et al. | |
| 5,404,868 A | 4/1995 | Sankrithi | |
| 5,444,972 A | 8/1995 | Moore | |
| 5,446,356 A | 8/1995 | Kim | |
| 5,448,868 A | 9/1995 | Lalvani | |
| 5,531,216 A | 7/1996 | Nicklas et al. | |
| 5,542,409 A | 8/1996 | Sampayo | |
| 5,673,684 A | 10/1997 | Myles, III et al. | |
| 5,681,642 A | 10/1997 | Sugisaki et al. | |
| 5,706,798 A | 1/1998 | Steinorth | |
| 5,787,877 A | 8/1998 | Nicklas et al. | |
| 5,793,934 A | 8/1998 | Bauer | |
| 5,804,942 A | 9/1998 | Jeong | |
| 5,806,553 A | 9/1998 | Sidwell | |
| 5,819,008 A | 10/1998 | Asama et al. | |
| 5,820,168 A | 10/1998 | De Giacomoni | |
| 5,846,659 A | 12/1998 | Lower et al. | |
| 5,851,309 A | 12/1998 | Kousa | |
| 5,857,322 A | 1/1999 | Cohn | |
| 5,896,488 A | 4/1999 | Jeong | |
| 5,899,199 A | 5/1999 | Mills | |
| 5,929,530 A | 7/1999 | Stone | |
| 5,938,364 A | 8/1999 | Hayden | |
| 5,956,917 A | 9/1999 | Reynolds | |
| 5,964,216 A | 10/1999 | Hoffschmidt et al. | |
| 5,982,481 A | 11/1999 | Stone et al. | |
| 6,000,211 A | 12/1999 | Bellac et al. | |
| 6,041,274 A | 3/2000 | Onishi et al. | |
| 6,056,240 A | 5/2000 | Hagenlocher | |
| 6,065,267 A | 5/2000 | Fisher | |
| 6,111,638 A | 8/2000 | Chou et al. | |
| 6,123,067 A | 9/2000 | Warrick | |
| 6,131,565 A | 10/2000 | Mills | |
| 6,169,414 B1 | 1/2001 | Yoshino et al. | |
| 6,205,739 B1 | 3/2001 | Newlin | |
| 6,234,166 B1 | 5/2001 | Katsir et al. | |
| 6,237,337 B1 | 5/2001 | Bronicki et al. | |
| 6,250,693 B1 | 6/2001 | Gensert et al. | |
| 6,279,312 B1 | 8/2001 | Hennecke | |
| 6,292,752 B1 | 9/2001 | Franke et al. | |
| 6,317,229 B1 | 11/2001 | Otterson | |
| 6,321,539 B1 | 11/2001 | Bronicki et al. | |
| 6,349,521 B1 | 2/2002 | McKeon et al. | |

(56) References Cited

U.S. PATENT DOCUMENTS

| | | |
|---|---|---|
| 6,359,212 B1 | 3/2002 | Hall et al. |
| 6,409,228 B1 | 6/2002 | Fadini et al. |
| 6,433,867 B1 | 8/2002 | Esquivel |
| 6,469,466 B1 | 10/2002 | Suzuki |
| 6,470,271 B2 | 10/2002 | Matsunaga |
| 6,484,506 B1 | 11/2002 | Bellac et al. |
| 6,625,983 B2 | 9/2003 | Kawasaki |
| 6,639,421 B1 | 10/2003 | Yoshino et al. |
| 6,662,801 B2 | 12/2003 | Hayden et al. |
| 6,680,693 B2 | 1/2004 | Urban et al. |
| 6,688,303 B2 | 2/2004 | Davenport et al. |
| 6,694,738 B2 | 2/2004 | Bronicki et al. |
| 6,740,381 B2 | 5/2004 | Day et al. |
| 6,772,062 B2 | 8/2004 | Lasky et al. |
| 6,772,671 B2 | 8/2004 | Asano et al. |
| 6,792,759 B2 | 9/2004 | Rollins, III |
| 6,827,911 B1 | 12/2004 | Gering |
| 6,837,010 B2 | 1/2005 | Powell et al. |
| 6,848,796 B2 | 2/2005 | Tagirov |
| 6,892,502 B1 | 5/2005 | Hubbell et al. |
| 6,989,924 B1 | 1/2006 | Jorgensen et al. |
| 7,055,519 B2 | 6/2006 | Litwin et al. |
| 7,065,927 B2 | 6/2006 | Powell et al. |
| 7,104,064 B2 | 9/2006 | Hon |
| 7,155,309 B2 | 12/2006 | Peless et al. |
| 7,163,241 B2 | 1/2007 | Liu et al. |
| 7,228,230 B2 | 6/2007 | Hirokawa |
| 7,281,381 B2 | 10/2007 | Johnson |
| 7,291,056 B2 | 11/2007 | Ohishi et al. |
| 7,349,759 B2 | 3/2008 | Peless et al. |
| 7,393,577 B2 | 7/2008 | Day et al. |
| 7,530,201 B2 | 5/2009 | Reynolds et al. |
| 7,578,109 B2 | 8/2009 | Reynolds et al. |
| 7,587,862 B2 | 9/2009 | Reynolds et al. |
| 7,612,937 B2 | 11/2009 | Jorgensen et al. |
| 7,849,687 B2 * | 12/2010 | Heusser et al. ............ 91/420 |
| 7,883,288 B2 | 2/2011 | Jorna |
| 2003/0163966 A1 | 9/2003 | Reynolds et al. |
| 2004/0074180 A1 | 4/2004 | Barmakian et al. |
| 2004/0074202 A1 | 4/2004 | Barmakian et al. |
| 2004/0128940 A1 | 7/2004 | LaForge |
| 2004/0168383 A1 | 9/2004 | Reynolds et al. |
| 2004/0244376 A1 | 12/2004 | Litwin et al. |
| 2005/0034437 A1 | 2/2005 | McMurtry et al. |
| 2005/0050836 A1 | 3/2005 | Barmakian |
| 2005/0252153 A1 | 11/2005 | Barmakian et al. |
| 2006/0048800 A1 | 3/2006 | Rast et al. |
| 2006/0053726 A1 | 3/2006 | Reynolds et al. |
| 2006/0174622 A1 | 8/2006 | Skowronski |
| 2006/0181765 A1 | 8/2006 | Jorgensen et al. |
| 2006/0225729 A1 | 10/2006 | Litwin |
| 2006/0229773 A1 | 10/2006 | Peretz |
| 2006/0260314 A1 | 11/2006 | Kincaid et al. |
| 2006/0277843 A1 | 12/2006 | Livingston et al. |
| 2007/0011983 A1 | 1/2007 | Reynolds et al. |
| 2008/0046130 A1 | 2/2008 | Faivre et al. |
| 2008/0050579 A1 | 2/2008 | Kirkman et al. |
| 2008/0072516 A1 | 3/2008 | Reynolds et al. |
| 2008/0127595 A1 | 6/2008 | Reynolds et al. |
| 2008/0127647 A1 | 6/2008 | Leitner |
| 2008/0168981 A1 | 7/2008 | Cummings et al. |
| 2008/0204352 A1 | 8/2008 | Reynolds et al. |
| 2008/0226846 A1 | 9/2008 | Hill |
| 2008/0247069 A1 | 10/2008 | Bronstein |
| 2008/0283113 A1 | 11/2008 | Conger |
| 2009/0000613 A1 | 1/2009 | Edwards et al. |
| 2009/0095283 A1 | 4/2009 | Curtis et al. |
| 2009/0101195 A1 | 4/2009 | Reynolds et al. |
| 2009/0188488 A1 | 7/2009 | Kraft et al. |
| 2009/0205637 A1 | 8/2009 | Moore et al. |
| 2009/0260753 A1 | 10/2009 | Selig et al. |
| 2010/0000570 A1 | 1/2010 | Mertins et al. |
| 2010/0005752 A1 | 1/2010 | Hawkins et al. |
| 2010/0032016 A1 | 2/2010 | Gee et al. |
| 2010/0071683 A1 | 3/2010 | Selig et al. |
| 2010/0199972 A1 | 8/2010 | Brost |

FOREIGN PATENT DOCUMENTS

| | | |
|---|---|---|
| AU | 4995099 | 1/2001 |
| AU | 7300713 | 4/2008 |
| AU | 8311746 | 4/2009 |
| CA | 721243 | 11/1965 |
| CA | 2664192 | 4/2008 |
| CN | 1376228 | 10/2002 |
| CN | 1170993 | 10/2004 |
| CN | 101529027 A | 9/2009 |
| DE | 43 17 279 | 12/1994 |
| DE | 203 14 172 | 12/2003 |
| DE | 69930635 T2 | 12/2006 |
| DE | 602007003164 | 12/2009 |
| EP | 0 314 199 | 9/1991 |
| EP | 1 801 517 | 12/2005 |
| EP | 1 764 565 | 2/2006 |
| EP | 1 200 683 | 3/2006 |
| EP | 1 754 942 | 2/2007 |
| EP | 1 903 155 | 11/2009 |
| EP | 2 123 834 | 11/2009 |
| EP | 2 128 352 | 12/2009 |
| EP | 2 154 301 | 2/2010 |
| IL | 0197541 | 12/2009 |
| JP | 58150831 | 9/1983 |
| JP | 59012952 | 1/1984 |
| JP | 59072401 | 4/1984 |
| JP | 62011744 | 1/1987 |
| JP | 2262037 | 10/1990 |
| JP | 4333254 | 11/1992 |
| JP | 06003194 | 1/1994 |
| JP | 11182026 | 7/1999 |
| JP | 2001077384 | 3/2001 |
| JP | 2002063807 | 2/2002 |
| JP | 2003194419 | 7/2003 |
| JP | 2003229009 | 8/2003 |
| MX | 2009003087 | 5/2009 |
| WO | WO 80/02604 | 11/1980 |
| WO | WO 96/33787 | 10/1996 |
| WO | WO 00/07818 | 2/2000 |
| WO | WO 01/04430 | 1/2001 |
| WO | WO 02/082037 | 10/2002 |
| WO | WO 2004/099682 | 11/2004 |
| WO | WO 2005/003645 | 1/2005 |
| WO | WO 2005/003646 | 1/2005 |
| WO | WO 2005/003647 | 1/2005 |
| WO | WO 2005/078360 | 8/2005 |
| WO | WO 2005/108959 | 11/2005 |
| WO | WO 2008/058528 | 3/2008 |
| WO | WO 2008/039233 | 4/2008 |
| WO | WO 2009/052220 | 4/2009 |
| WO | WO 2009/052520 | 4/2009 |
| WO | WO 2009/105291 | 8/2009 |
| WO | WO 2010/006056 | 1/2010 |
| WO | WO 2010/006193 | 1/2010 |
| WO | WO 2010/022280 | 2/2010 |
| WO | WO 2010/083292 | 7/2010 |

OTHER PUBLICATIONS

Baccaro, S., et al. (2003), "Quality control facilities for large optical reflectors at ENEA-Casaccia for physics application," Nuclear Physics B (Proc. Suppl.) 125:272-276.

Dersch et al. (2004) "Trough Integration into Power Plants—A Study on the Performance and Economy of Integrated Solar Combined Cycle Systems," Energy 29:947-959.

Eckart [Hydraulik•Pneumatik] (downloaded Aug. 23, 2010) "Produkte mit starkem Profil" http://www.eckart-gmbh.de/.

El-Sayed, M. (2005) "Solar Supported Steam Production for Power Generation in Egypt," Energy Policy 33:1251-1259.

El-Wakil, M.M. (1984) "Combined Cycles: General," In; Powerplant Technology, New York: McGraw-Hill Hardcover, pp. 341-351.

Feuermann, D., et al. (2002), "Solar Fiber-Optic Mini-Dish Concentrators: First Experimental Results and Field Experience," Solar Energy 72(6):459-472.

(56) References Cited

OTHER PUBLICATIONS

Flagsol (2006) "ISCCS—Integrated Solar Combined Cycle System," http://www.flagsol.com/ISCCS_tech.htm, Downloaded Sep. 9, 2006.

Horn et al. (2004) "Economic Analysis of Integrated Solar Combined Cycle Power Plants; A Sample Case: The Economic Feasibility of an ISCCS Power Plant in Egypt," Energy 29:935-945.

Hosseini et al. (2005) "Technical and Economic Assessment of the Integrated Solar Combined Cycle Power Plants in Iran," Renewable Energy 30:1541-1555.

Kaminski, J. et al. (2006), "Full-Field Shape Measurement of Specular Surfaces," in Fringe, 2005, The 5th International Workshop on Automatic Processing of Fringe Patterns, pp. 372-379.

Kelly et al. (2001) "Optimization Studies for Integrated Solar Combined Cycle Systems," Proceedings of Solar Forum 2001, Solar Energy: The Power to Choose, Apr. 21-25, Washington, DC.

Lietner et al. (2002) "Brighter than a Hundred Suns," U.S. Department of Energy/NREL publication, p. 10 of 144-06P spec.

Mulholland, G.W. and Germer, T.A. (2003), "Modeling, Measurement and Standards for Wafer Inspection," Proc. Government Microcircuits Applications and Critical Technologies Conference, "Countering Asymmetric Threats," Tampa, FL, published on ScatterWorks, In. website.

"National Renewable Energy Laboratory, USA Rough: Near-Term Component/Subsystem Development, Task I-B-1: Space Frame Design, Draft Detailed Report" (Aug. 25, 2005), prepared by Gossamer Space Frames.

Novatec BioSol AG Presentation Nov. 7, 2007. http://www.menarec.org/resources/NOVATEC-BioSol_20071107.pdf.

Novatec BioSol AG Presentation Nov. 26, 2007. Hotel Intercontinental Germany-Frankfurt. http://www.rural-electrification.com/cms/upload/pdf/Presentations_Jordanian_Delegation_Visit/07_NOVATEC-BioSol_20071126.pdf.

Product Literature for Portable Specular Reflectometer Model 15R, Devices and Services Company, http://devicesandservices.com/prod02.htm, last modified May 25, 2007.

"Truss Connection," YouTube, Jul. 4, 2007 http://www.youtube.com/watch?v=FtoQJONKRm0.

Ulmer, S et al. (2006), "Slope Measurements of Parabolic Dish Concentrators Using Color-coded Targets," SolarPACES2006 A7-S5:1-8.

(Dec. 19, 2007) "Aquaflector." http://www.aquaflector.com/index.html.

(Dec. 19, 2007) "Aquaflector." http://www.aquaflector.com/rationale.html.

(Dec. 19, 2007) "Aquaflector." http://www.aquaflector.com/technology.html.

(Dec. 19, 2007) "Aquaflector." http://www.aquaflector.com/contact.html.

U.S. Appl. No. 61/079,382, filed Jul. 9, 2008, Farr et al.

U.S. Appl. No. 61/029,466, filed Feb. 18, 2009, Gee et al.

Helac Corporation (Apr. 2007) "Helical, Hydraulic Rotary Actuators, T20 Series," Product Manual.

Helac Corporation, (2003) "Helical, Hydraulic Rotary Actuators, L20 Series," Product Manual.

Helac Corporation (2004) "Helical, Hydraulic Rotary Actuators, L30 Series," Product Manual.

Helac Corporation (Jun. 2001) "Sprayer Steers Clear of the Ordinary," *Hydraulics and Pneumatics* http://www.hydraulicspneumatics.com.

(Mar. 20, 2008) "Precision Actuator Puts New Spin on Solar Power," *Machine Design* 24: http://machinedesign.com/article/precision-actuator-puts-new-spin-on-solar-power-0320.

\* cited by examiner

HYDRAULIC-BASED ROTATIONAL SYSTEM FOR SOLAR CONCENTRATORS THAT RESISTS HIGH WIND LOADS WITHOUT A MECHANICAL LOCK

CROSS-REFERENCE TO RELATED APPLICATION

This application claims priority to U.S. Provisional Patent Application Ser. No. 61/091,254 filed Aug. 22, 2008, which is incorporated herein by reference to the extent not inconsistent herewith.

BACKGROUND

Previous rotational systems for rotating large parabolic trough solar collectors to allow them to track the movement of the sun across the sky used a variety of equipment configurations including: (1) motorized gearboxes (e.g. worm gear drive units) to provide the slow-movement, high-torque output needed for precise sun tracking (for example, the Luz Solar-1 (LS-1) and Luz Solar-2 (LS-2) solar collectors of the California Luz company installed at the large solar electric generation station (SEGS) systems in California used worm gear drive units); (2) hydraulic cylinders (which elongate in a linear fashion when pressurized by hydraulic fluid) arranged in a mechanical system that converts the linear motion of the cylinders into the desired rotational motion; and (3) rack-and-pinion rotary actuators (that provide for rotation during sunny normal-operating conditions) along with a companion mechanical locking system that provides enough added strength to resist the very high torques produced by the solar collectors during high wind conditions.

However, these prior systems had a number of disadvantages. For example motorized gearboxes (used in the early SEGS systems installed in the mid-to-late 1980s in California) had two main disadvantages. First, these high-reduction systems use worm gearing, a gear arrangement in which a worm, which is a gear in the form of a screw, meshes with a worm gear. This approach is imprecise owing to significant "backlash" inherent in worm gearing. Second, the contact area between the worm and the worm gear is quite small. This small contact area results in extremely limited overload capability. To raise the overload capability, the size of the gearing must be increased substantially, which substantially increases costs.

Hydraulic cylinders can be more precise than gearboxes, since they do not have backlash problems. The rod of the hydraulic cylinder extends (or contracts) as pressurized fluid is pumped into one side (or the other) of the piston inside the cylinder. But a hydraulic cylinder is a linear device, and even when arranged as a mechanical linkage it cannot provide the desired rotation range of 180 to 240 degrees (and generally is not used when a rotation range over 120 degrees is needed) owing to physical limitations of linkages. So, to achieve the rotation range that is needed by parabolic trough collectors, two linear cylinders are used in combination. This results in a complicated mechanical system, which is expensive. This kind of complicated system has been used on systems in the U.S. (the SEGS 8 and 9 solar projects in Harper Lake, Calif., as well as some projects in Europe).

Hydraulic rack and pinion rotary actuators (for example as used at a recently completed parabolic trough system in Nevada) do indeed directly provide rotational output, but these rack-and-pinion actuators have very limited rotational overload capability. This limited overload capability is the result of the small amount of contact area between the pinion gear and the gear rack. The high forces produced during high wind events, when reacted to by the small amount of contact area between the pinion gear and the gear rack, result in gear contact pressures that are too high for the gearing to withstand. In practice, to compensate for the very limited overload capability of the rack and pinion gearing, another external locking device is added that can handle these high forces, which eliminates the need for the rack-and-pinion gearing to handle these very high contact pressures. This external locking device adds significant cost, adds complexity, and has been found to be difficult to employ with reliability in actual field operations.

The following U.S. patents are believed relevant to aspects of this disclosure: U.S. Pat. Nos. 3,511,134, 3,548,866, 3,559,534, 4,161,905, 4,328,789, 4,628,692, 4,739,620, 5,138,838, 5,531,216, 5,806,553, 6,123,067, 6,662,801, and 6,772,671. All patents and publications referred to herein and all patents and publications submitted herewith, are incorporated herein by reference to the extent not inconsistent herewith for purposes of written description and enablement.

The foregoing examples of the related art and its limitations are intended to be illustrative and not exclusive. Other limitations of the related art will become apparent to those of skill in the art upon a reading of the specification and a study of the drawings.

SUMMARY

A cost-effective solution to the need for a system for rotating solar collectors is provided herein. The system can provide sun-tracking rotation to parabolic solar trough collectors, to parabolic dish collectors, which are large solar collector concentrators in the shape of "parabolas of revolution," other linear focusing solar collectors such as linear Fresnel reflectors, as well as large photovoltaic solar energy collectors that are designed to follow the sun's motion across the sky. Such collectors require a rotary actuation device that has precise positioning requirements and modest torque requirements during normal sunny time periods, but occasionally must resist very high wind loads when they are in a static/stow position (for example, in the event of an extreme 80+ mph wind).

It has been discovered that the deficiencies of previous collector-rotation systems become economically important when large-scale solar fields in areas where high temperatures and high winds occur. The present system overcomes these deficiencies in a simple and efficient way by fulfilling three key requirements in one system: a) accurate rotation of a large parabolic trough solar collector to follow the sun's movement across the sky from horizon to horizon during normal sunny days, requiring 180 degrees of rotation; b) the ability to withstand very high overturning moment loads (when the collector is in a static, low-profile, downward-facing position, referred to herein as the "stow" position) without mechanical failure during extreme high-wind conditions; and c) the ability to lock in place when high internal pressure (for example above about 6000 psi) is caused by high winds, but to relieve pressure (unlock) when high internal actuator pressure (again, for example above about 6000 psi) is caused by an increase in outdoor ambient temperature.

The system provided herein achieves the purposes of precise but high-torque rotary motion with very high overload capability, and with the ability to lock the solar collector in place in a low-profile, downward-facing "stow" position under high winds, yet to also keep the collector unlocked when high internal pressures are caused by significant increases in outdoor temperatures, all in a cost effective way.

"High winds" as used herein means winds of at least about 30-45 mph, and "high torque" means sufficient torque to rotate the collector into stow position under such high winds of about 30 to 45 mph. "Very high winds" as used herein means high winds up to about 80 mph or more. "Very high overload capacity," means sufficient resistance to prevent the collector from moving out of stow position under very high wind conditions. A hydraulic-based rotary actuator is provided that has high torque and very high overload capacity during a static condition (that is, a non-moving overnight/ stow position of the solar collector), and has a control system comprising hydraulic components such as pressure-sensing devices, valves and controls, that provide locking of the actuator even when high pressures are developed within the actuator at times of very high winds without relieving these high hydraulic fluid pressures (which would defeat the lock feature). In addition, the control system allows for the relief of high pressures within the actuator that results when, for example, thermal expansion of the hydraulic fluid inside the actuator occurs from a significant increase in outdoor ambient temperature. Advantageously, the actuator provides sufficient torque to move the solar collector to the "stow" position under, for example, 30-45 mph winds. When the wind velocity rises above 30 mph the collectors are generally programmed or operated to begin moving to the stow position, so as to be safely stowed during times of very high winds, such as 80 mph.

The hydraulic system provided herein has a number of advantages over previously-known systems. First, the helically-geared hydraulic rotary actuator that provides the torque output for rotation of the trough collectors allows for very precise and accurate rotational movements, ensuring that the collectors can accurately track the sun. Second, this same hydraulic device, which has enough torque output to rotate the collector to follow the sun's movement throughout the day during normal sunny time periods, also has enough torsional strength to stay locked in place and resist the very high torque loads that are imparted into the hydraulic device during times of very high winds. Third, the helically-geared rotary actuator has a very high level of overload capability, so there is no need for an external mechanical locking apparatus to resist the high torque loads caused by very high winds. Fourth, the system is cost effective, since an external mechanical locking apparatus is not needed. Fifth, the hydraulic unit has the ability to lock in place when high internal actuator pressure (for example, above about 6000 psi) is caused by high winds, but to relieve pressure (unlock) when high internal actuator pressure (again, for example above about 6000 psi) is caused by an increase in outdoor ambient temperature.

A helically-geared hydraulically-driven rotary actuator has not previously been used in the art for providing sun-tracking rotation to solar collectors, although others have used other types of rotary actuators for providing sun-tracking rotation to solar collectors, and some have been hydraulically powered. In addition a helically-geared hydraulically-driven rotary actuator in combination with a control system comprising a hydraulic-based assembly of components that provides for locking of the actuator against high winds has not previously been used. Locking means the actuator will not "let go" and release the pressure, which would allow the collector to rotate as a result of the wind, at significant risk of harm to the equipment and personnel in the field. In addition, the assembly of components provided herein also allows for pressure relief of the actuator when thermal expansion of the hydraulic fluid in the actuator causes a pressure above a selected level in the actuator, yet, it distinguishes between this event (for example as caused by a significant increase on outdoor ambient temperature) and the high internal pressures that occur during high winds.

The rotational actuator system for controlling rotation of a parabolic solar collector comprises: a bi-directional hydraulic rotational actuator; and a control system hydraulically connected to the actuator; wherein the actuator is capable of exerting at least about 250,000 in-lb and advantageously at least about 380,000 in-lb, of torque up to about 550,000 in-lb, and advantageously up to about 750,000 in-lb of torque. Advantageously, the actuator is capable of rotating through an arc greater than about 180 degrees, for example through an arc of at least to about 240 degrees, so as to allow the solar collector to track the sun (typically through a 180-degree arc) and also to be further rotated into locked-down stow position at night or during high wind conditions, other weather conditions that might damage the collector, or when it is desired that the solar collector not be in use. The actuator must be able to exert sufficient force to rotate large solar collectors of the type described herein that are operationally attached thereto to rotate into stow position under high wind conditions.

The actuator system provided herein comprises means for locking rotation of the actuator under high wind conditions when the solar collector is in stow position and/or for relieving pressure in the system under high temperature conditions.

In embodiments, the system comprises a bi-directional hydraulic rotational actuator; a control system hydraulically connected to said actuator; and automatic means for locking said actuator in stow position under high wind conditions, e.g., about 30 to about 45 mph and advantageously up to at least about 80 mph. The actuator is capable of exerting between about 250,000 in-lb of torque and about 750,000 in-lb of torque, and is capable of rotating through an arc having a selected upper limit of about 180 to about 240 degrees.

The rotational actuator advantageously comprises: a through-shaft having first and second ends and comprising first helical gear teeth; a piston having an inner circumference comprising second helical gear teeth configured to mesh with the first helical gear teeth; and an outer circumference comprising third helical gear teeth; a housing at least partially surrounding the through-shaft and the piston, the housing having an inner surface comprising fourth helical gear teeth configured to mesh with the third helical gear teeth; a first port through the housing for receiving hydraulic fluid, the first port being positioned such that pressure from hydraulic fluid introduced into the housing through the first port causes the piston to move in a first direction away from the first port; and a second port for receiving hydraulic fluid; the second port being positioned such that pressure from hydraulic fluid introduced into the housing through the second port causes the piston to move in a second direction away from the second port; such that when hydraulic fluid is entering the actuator through the first port, the through-shaft rotates in a first direction and when hydraulic fluid is entering the actuator through the second port, the through-shaft rotates in a second direction; and when no hydraulic fluid is being pumped into the actuator, the actuator is locked such that the through-shaft does not rotate, even under high wind conditions.

The control system also comprises: first and second hydraulic pressure lines operationally connected to the actuator through first and second ports; and a bi-directional motor and pump connected to the first and second hydraulic pressure lines.

The control system also comprises means for relieving pressure in the system, including in the rotational actuator itself, under high temperature conditions. The term "high temperature conditions" as used herein means temperatures at which the pressure in the actuator rises to a selected pressure, typically set to be a pressure (e.g., 6000 psi) at which there is a risk of causing damage to the actuator if that high pressure is held for a lengthy time period (e.g. several hours), which will trigger pressure relief in the system, as more particularly described below. The pressure-relief system is triggered when the actuator is not rotating, and when pressure in the actuator and hydraulic lines can build up because of the effect of ambient temperature on the actuator and hydraulic components when the fluid is not circulating.

Advantageously, the means for relieving pressure in the system during high temperature conditions comprise: a pressure relief line operationally connected to the actuator; first and second pressure sensors respectively operationally connected to a first and second hydraulic pressure line, the second pressure sensor also advantageously being operationally connected to the pressure relief line; the first and second pressure sensors being capable respectively of sending first and second pressure signals; a computer processor capable of receiving the first and second pressure signals from the first and second pressure sensors, and capable of sending a solenoid valve control signal in response to the received pressure signals; and a solenoid valve in operational connection to the pressure relief line capable of receiving the solenoid valve control signal from the processor; such that the control signal from the processor opens or closes the solenoid valve. In an embodiment, the pressure relief line is operationally connected to the actuator through the second hydraulic line.

Under high ambient temperatures, the processor is programmed to send a solenoid valve control signal causing the solenoid valve to open when it receives a pressure signal indicating pressures at or above a first selected value, e.g., 6000 psi, from both of said pressure sensors. The process is also programmed to send a signal to said solenoid valve causing it to close when it receives pressure signals from said pressure sensors indicating pressures at or below a second selected value, e.g., about 3500 psi to about 4500 psi. The first selected pressure, which triggers opening of the solenoid value to send hydraulic fluid to a hydraulic fluid reservoir, thereby relieving the pressure and preventing over-pressure damage to the system, is, in an embodiment, about 6000 psi. Other such triggering pressures can be selected depending on the strength and materials of system components.

The second selected pressure, which triggers closing of the valve, is selected to be low enough such that there will be a large enough gap between the first and second selected pressures such that the valve will not open and close numerous times per day. It is desirable that the valve not be triggered to open and close more than about three or four times a day. In an embodiment, the second selected pressure value is between about 3500 and 4500 psi.

In operating the system in areas where high winds are likely to occur, the collector will typically be rotated into stow position, either automatically or by an operator, when high winds of about 30 to about 45 mph occur. Anemometers can be used to detect wind velocity and automatically initiate rotation of the collector into stow position, for example, as described in U.S. Provisional Patent Application Ser. No. 61/029,466, filed Feb. 18, 2008, which is incorporated herein by reference to the extent not inconsistent herewith for purposes of enablement and written description.

The automatic means provided herein for locking the actuator in stow position under high wind conditions up to about 30-45 mph and in embodiments, up to 80 mph or more, comprise: first and second check valves on first and second hydraulic lines, respectively; a first pilot line connected to the second hydraulic line, which is operationally connected to the first check valve; and a second pilot line connected to the first hydraulic line, which is operationally connected to the second check valve; such that back-pressure in one of the hydraulic lines caused by wind pressure rotating the actuator to push hydraulic fluid into the hydraulic line closes the check valve on that hydraulic line and prevents further flow of hydraulic fluid in the system, resulting in prevention of further movement of the actuator, thereby preventing movement of the solar collector out of stow position. Under high winds, back-pressure will occur in only one of the hydraulic lines. If the pressure sensors and computer processor are activated, only one pressure sensor would sense high pressure, and thus pressure relief would not be triggered. However, there is no need for the control system components to be turned on (using external power), because the hydraulic system automatically locks the actuator and prevents movement of the solar collector out of stow position by means of the hydraulic lines and check valves. "Automatic" in this context means without the need for operator intervention or external power (other than the force of the wind).

The actuator system provided herein also comprises at least one solar collector operationally connected to the actuator. The system can also include multiple collectors operationally connected to a single actuator. The term "multiple collectors" means two to about sixteen, and any number of collectors between two and sixteen.

Also provided herein is a method of making a rotational actuator system for controlling rotation of a solar collector. This method comprises: providing a bi-directional hydraulic rotational actuator capable of exerting enough torque to rotate at least one solar collector; providing a control system for controlling operation of the actuator; the control system comprising automatic means for causing the actuator to remain locked during high-wind conditions; and hydraulically connecting the control system to the actuator. The method also comprising hydraulically connecting to the actuator automatic means for allowing the actuator to relieve high pressures (to prevent damage to the actuator, its internal seals, etc.) caused by high temperature conditions. In this context, "automatic" means without operator intervention, but external power can be supplied to run the necessary components such as the computer processor and sensors.

Also provided herein is a method of preventing rotation of one or more solar collector(s) from the stow position. The method comprises: providing a bi-directional hydraulic rotational actuator capable of exerting sufficient torque to rotate the collector(s) to track the sun; operably connecting this actuator to a control system comprising check valves and hydraulic lines; whereby the control system is configured to prevent backflow of hydraulic fluid from the actuator caused by high winds; wherein the check valves automatically prevent backflow of hydraulic fluid from circulating in one of said hydraulic lines, thereby preventing rotation of the actuator.

In addition to the exemplary aspects and embodiments described above, further aspects and embodiments will become apparent by reference to the drawings and by study of the following descriptions.

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Provided herein is a rotational drive system useful for in enabling large parabolic trough solar collectors to precisely track the sun's movement across the sky during normal sunny days. It is also designed to resist the very high rotational loads on large solar collectors when extremely high wind loads occur. Wind speeds of about 85 mph currently occur only once every 25 years, on average, in most U.S. locations, but these rare events produce extremely high rotational loads that are imparted to the rotational drive units of large parabolic trough solar collectors, which must be strong enough to resist these high loads without rotating (i.e., the rotational actuator must stay substantially locked in place, to keep the collectors from moving into a more wind-susceptible rotational position). But in addition to being sufficiently strong and staying locked in place during high winds, this drive system also allows for automatic pressure relief of the actuator when internal pressure of the hydraulic fluid is too high due to thermal expansion of the hydraulic fluid (which can occur just because of a rise in outdoor ambient temperature). The drive system locks in place when high internal pressure is caused by high winds, but relieves pressure when high internal pressure is caused by an increase in outdoor ambient temperature. The system components must be strong enough to resist breaking under the high pressures referred to herein.

Figure 1:
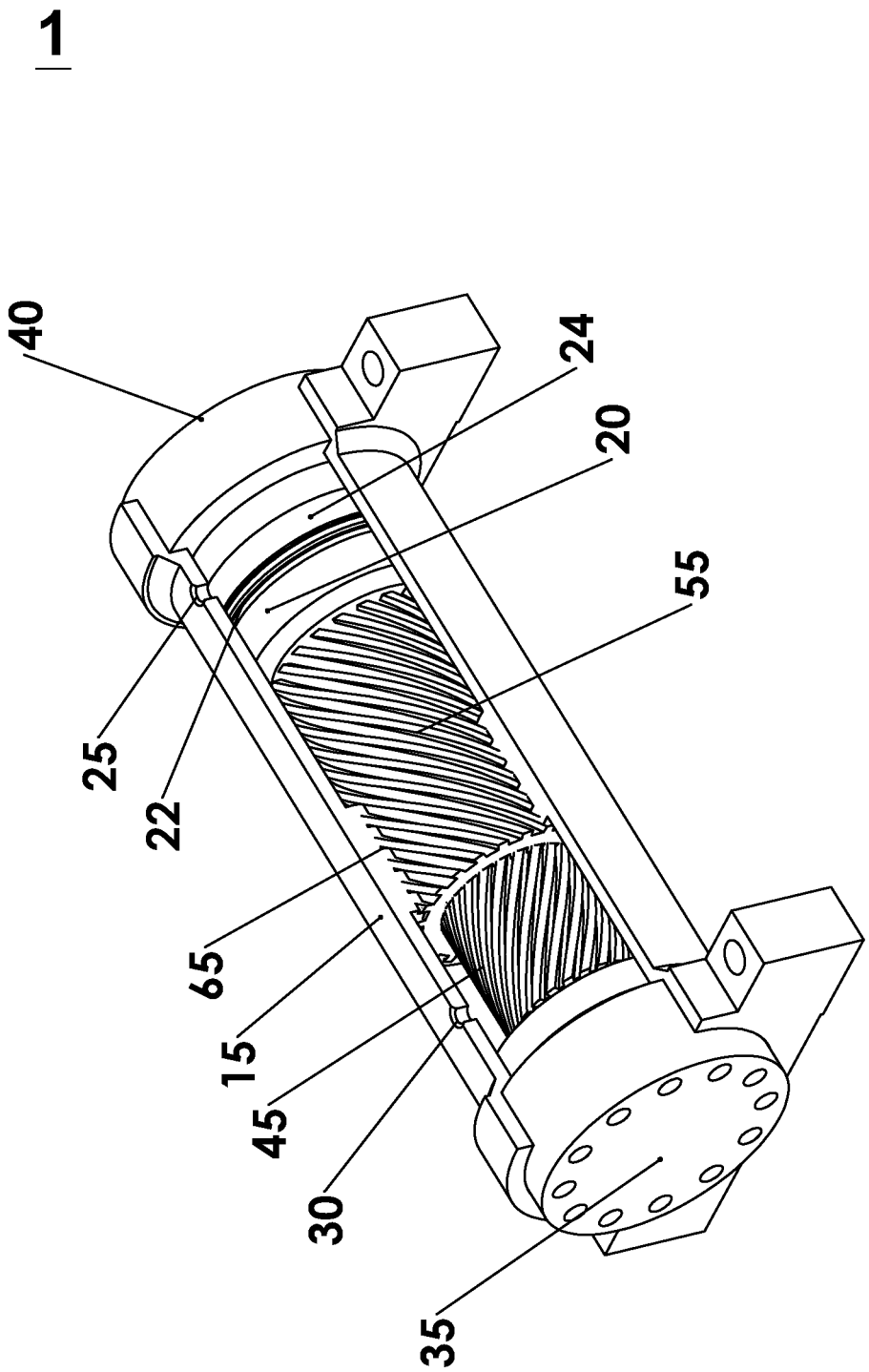
FIG. 1 is a perspective view of a helically-geared rotary actuator useful in the present system.

FIG. 1 is a cross-sectional view of a helically-geared rotary actuator 1 useful in the present system. Smaller versions of actuators having features of those used herein are commercially available, for example as provided by Helac Corporation of Enumclaw, Wash. (see Helac T20 Series rotary actuator Product Brochure available on the Helac Corporation.com website, incorporated herein by reference to the extent not inconsistent herewith for purposes of enablement and written description) and Eckart GmbH of Germany (see product information sheet directed to the rotary actuator labeled "Produkte mit starkem Profil," available on the Eckart-gmbh.de website, incorporated herein by reference to the extent not inconsistent herewith for purposes of enablement and written description). The actuators useful herein however, are much larger than actuators that can be purchased from these companies within the required rotational range of 180 to 240 degrees without being specially made, and are capable of producing at least about 250,000, or about 380,000 in-lb of torque, and up to 425,000, 450,000, 500,000 550,000, or 750,000 or more in-lb of torque. These actuators are capable of producing the amount of torque output needed to rotate the collectors to the stow position when subjected to high winds of about 30 to 45 mph or more. For example, the 380,000 in-lb of peak torque that an embodiment of the present actuator unit can deliver corresponds to the peak amount of torque created by an 8-module parabolic solar collector assembly when subjected to a 40 mph wind. Winds of 45 mph can create rotational loads of over 500,000 in-lb for solar collectors of dimensions 6 meters×114 meters. The present actuators are capable of rotating through 240 degrees.

Figure 2:
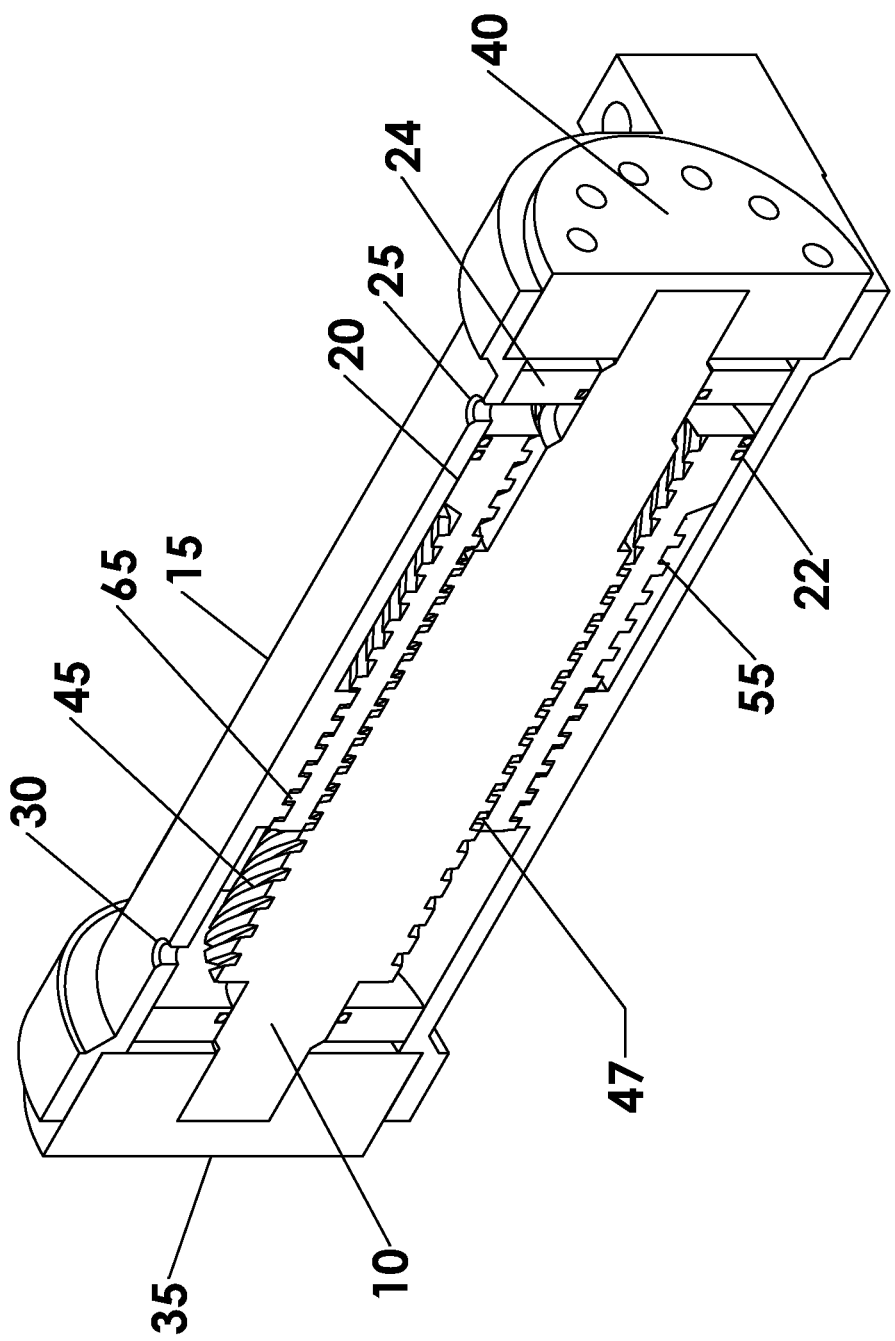
FIG. 2 is a perspective, cross-sectional view of the actuator shown in FIG. 1.
Figure 3:
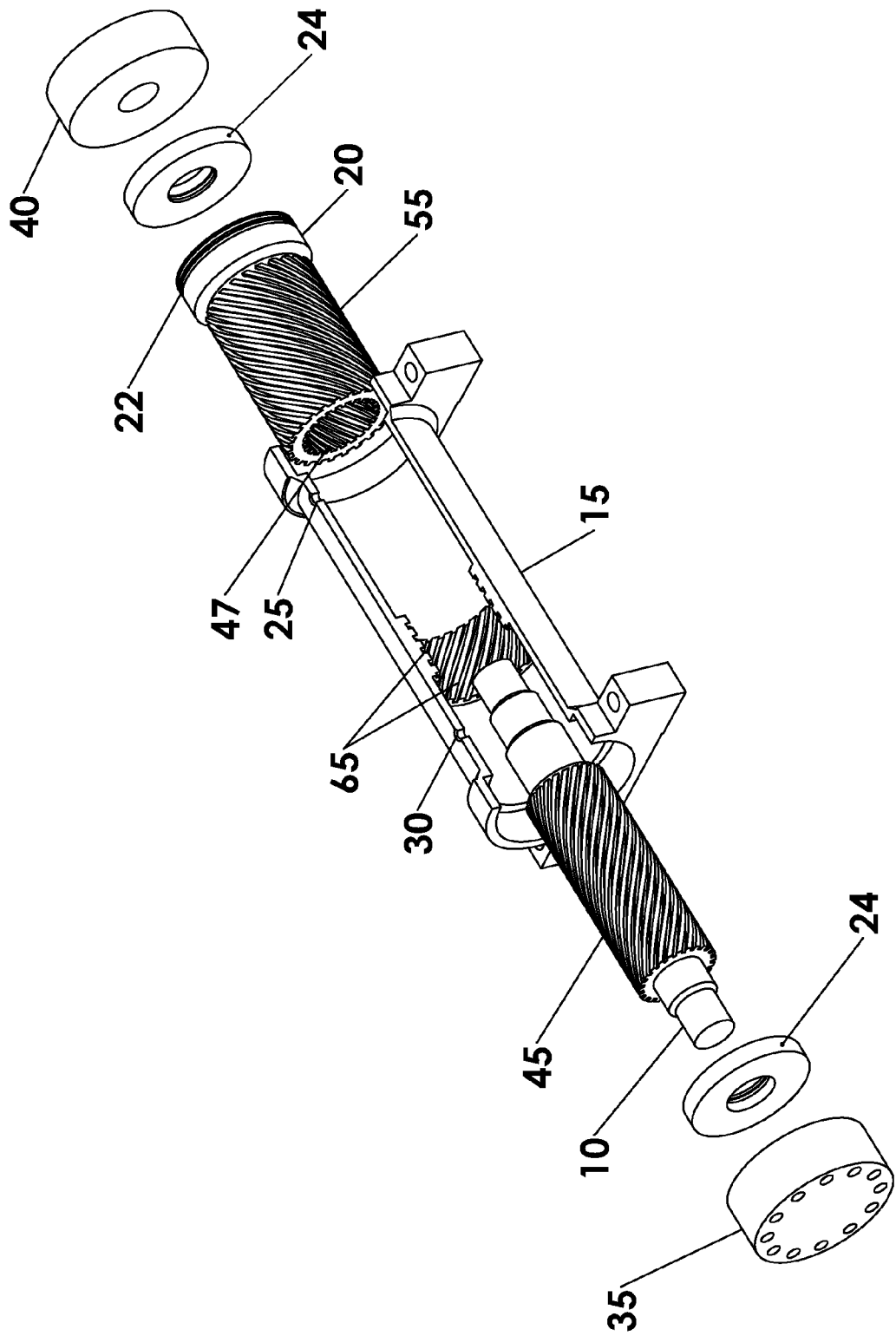
FIG. 3 is an exploded view of components of the actuator shown in FIGS. 1 and 2.

The rotary actuator 1 shown in FIGS. 1, 2, and 3 comprises a central through-shaft 10 (shown in FIGS. 2 and 3) and has a first end 35 and a second end 40, which are attached to the through-shaft 10 and rotate therewith. The rotational motion should be controlled for highly accurate rotation to keep the collector oriented (within 0.1 degrees of its proper angle) to maintain optimum performance. See, for example, U.S. Provisional Patent Application No. 61/029,466, filed Feb. 18, 2008, incorporated herein by reference to the extent not inconsistent herewith for purposes of enablement and written description. As best seen in FIG. 2, second ends 35 and 40 are adjacent to support bearings 24. The support bearings 24 support the through-shaft 10 at each of its ends, yet allow rotation of the through-shaft 10 inside the outer housing 15. The rotary actuator 1 also comprises an annular piston 20 equipped with seal 22, a hydraulic fluid pressure first port 25 and a hydraulic fluid pressure second port 30. A first set of helical gear teeth 45 on the central through-shaft 10 mesh with a matching second set of helical gear teeth 47 (shown in FIGS. 2 and 3) inside the circumference of piston 20. A third set of helical teeth 55 on the outside circumference of piston 20, with opposite hand to the gear teeth 47 on the inside circumference of the piston (e.g., left-hand threads as opposed to right-hand threads) meshes with a fourth set of helical teeth 65 on the inside of housing 15.

Operation of rotary actuator 1 is described as follows. To produce rotation of through-shaft 10, pressurized fluid entering second port 30 pushes on piston 20, causing it to rotate clockwise (when viewed facing the first end 35) against the fourth set of helical teeth 65 on the inside housing 15. The second set of helical teeth 47 on the inside of the rotating piston 20 engage with the first set of teeth 45 on the central through-shaft 10 causing central through-shaft 10 to rotate clockwise. Pressuring the first port 25 will return the piston and the shaft to their initial positions. Additional internal seals (not shown) can be present where required to prevent the hydraulic fluid from leaking and ensure development of the required high pressures.

Because the helical teeth remain engaged at all times, loads are distributed over a large amount of gear tooth area. This characteristic provides for a high overload capacity—and hence the actuator unit is capable of resisting the very high back-driving torques that are created during high winds of 80 mph or more without moving or breaking. While most gearing systems have very small gear tooth contact areas, this helical gearing system provides a large amount of contact area, a characteristic that benefits the merging of the helical gearing system with the rotation of a large parabolic trough solar collector.

Figure 4:
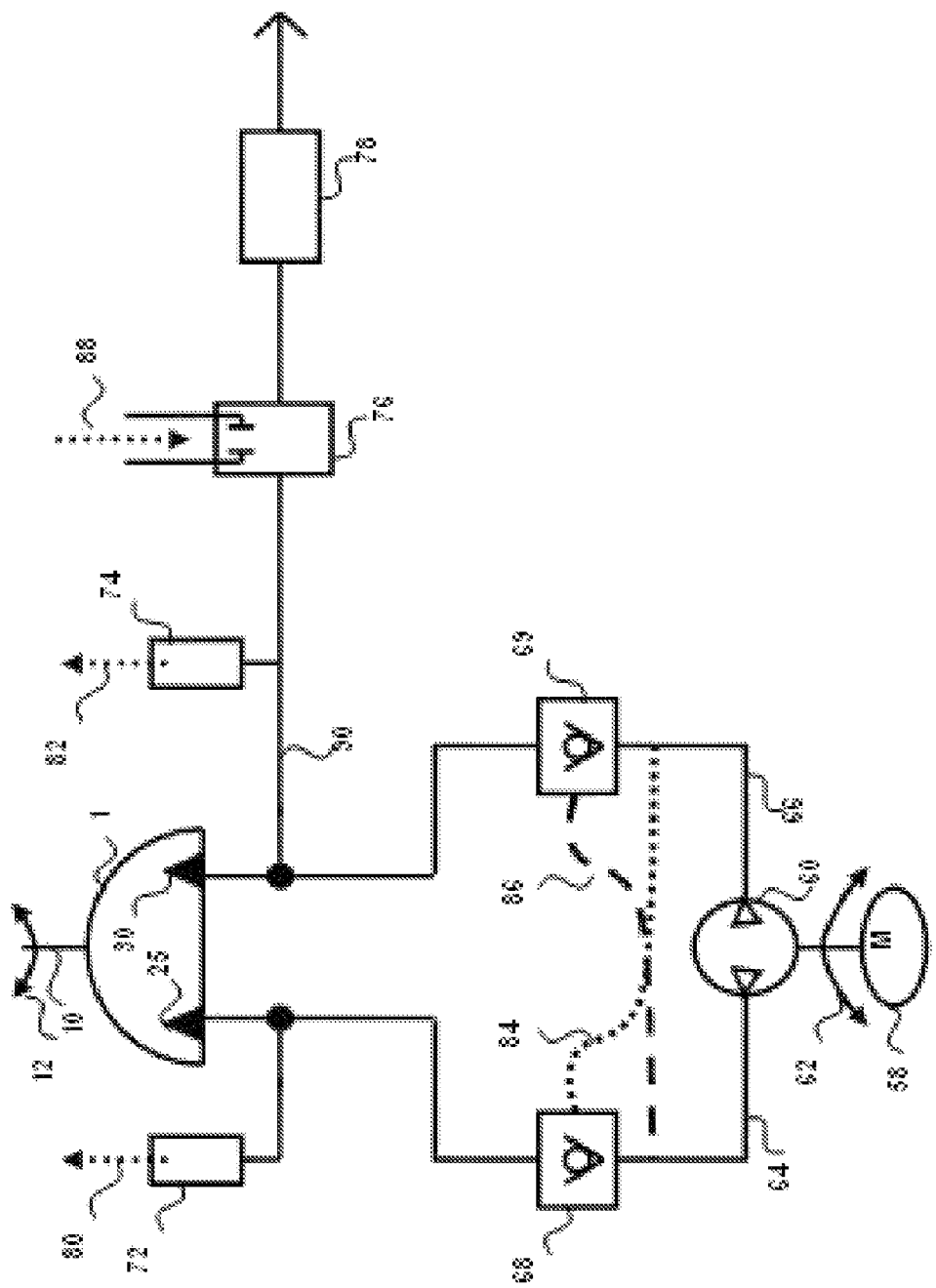
FIG. 4 is a schematic drawing showing an actuator system designed for rotating large solar collectors.

As shown below, the helical rotary actuator 1 can be configured to provide locking of the actuator against high loads such as those developed when very high winds occur, which impart large back-driving loads to actuator 1, yet to allow for pressure relief of the actuator when thermal expansion of the hydraulic fluid in the actuator causes too high a pressure. FIG. 4 is a schematic drawing showing an actuator system designed for rotating large solar collectors, depicting how actuator 1 is controlled. The control system for the actuator comprises pump 60 operationally connected to bi-directional motor 58. Arrows 62 indicate the directions of rotation of motor 58. Pump 60 is connected to first hydraulic line 64 and second hydraulic line 66. First pilot line 84 is connected to and pressurized by hydraulic fluid in second hydraulic line 66 and is operationally connected to first check valve 68. Second pilot line 86 is connected to and pressurized by hydraulic fluid in first hydraulic line 64, and is operationally connected to second check valve 69.

First and second hydraulic lines 64 and 66 are connected respectively to first and second ports 25 and 30 of actuator 1. First pressure sensor 72 on one side of actuator 1 is operationally connected to first hydraulic line 64 and generates first pressure signal 80. Second pressure sensor 74 on the other side of actuator 1 is operationally connected to second hydraulic line 66 and generates second pressure signal 82. Arrows 12 indicate the direction of rotation of actuator through-shaft 10, depending on whether hydraulic fluid enters actuator 1 through first port 25 through first hydraulic pressure line 64 or through second port 30 through second hydraulic pressure line 66. Second pressure sensor 74 is operationally connected to solenoid valve 76 on hydraulic pressure relief line 90, which is operationally connected to optional pressure relief valve 78. The arrow at the right side of FIG. 4 indicates the direction of flow of hydraulic fluid in hydraulic pressure relief line 90, as it flows on to a hydraulic fluid flow reservoir (not shown) in the event of overpressure that leads to opening of solenoid valve 76.

In operation, bi-directional motor 58 operates pump 60 to send pressurized hydraulic fluid through first hydraulic line 64 or second hydraulic line 66 to actuator 1, where the hydraulic fluid causes either clockwise (CW) or counter-clockwise (CCW) rotation of the through-shaft 10 of actuator 1. Neither first check valve 68 nor second check valve 69 can open when motor 58 and pump 60 are not running. When pump 60 is not running, actuator 1 is kept locked in place because hydraulic fluid is prevented from passing through either first check valve 68 or second check valve 69.

When pump 60 sends pressurized fluid through second hydraulic line 66, the fluid can flow through second check valve 69 and up to actuator 1 into second port 30. To complete the fluid circuit, fluid must exit first port 25 and flow through first pilot check valve 68 and then return through first hydraulic pressure line 64 to the pump 60. First check valve 68 would normally stop hydraulic fluid flow that comes out of actuator 1 into first hydraulic line 64, and prevent it from returning to pump 60, which would interrupt the flow circuit (from second hydraulic line 66 through actuator 1 to first hydraulic line 64 to pump 60 and again into second hydraulic line 66), and prevent actuator 1 from rotating. However, check valves 68 and 69 are pilot line-operated, so when the pressure in second hydraulic line 66 from pump 60 provides pressure on first pilot line 84 and disables (opens) first check valve 68, this allows the circuit to be completed, allowing back flow from first port 25 through first pilot check valve 68 to first hydraulic pressure line 64 so that actuator 1 can keep rotating.

Similarly, when pump 60 sends pressurized fluid through first hydraulic line 64, the fluid can flow through first check valve 68 and up to actuator 1. Second check valve 69 would normally stop hydraulic fluid flow that comes out of actuator 1 into second hydraulic line 66, and prevent it from returning to pump 60, which would interrupt the flow circuit (this time, from first hydraulic line 64 through actuator 1 to second hydraulic line 66 to pump 60 and again into first hydraulic line 64), and prevent actuator 1 from rotating. However, as when the flow was in the opposite direction as described above, when the hydraulic fluid in first hydraulic line 64 from pump 60 provides pressure on second pilot line 86 and disables second check valve 69, this allows the circuit to be completed so that actuator 1 can rotate.

As pointed out above, when pump 60 is not running, there will be no pressure on either first pilot line 84 or second pilot line 86, and the flow circuit will not be complete. Thus the check valves will prevent backflow from actuator 1 to pump 60. This means that when pump 60 is not running, actuator 1 is locked in place. This condition is desirable under high wind conditions when the solar collectors are not tracking the sun's movement and should remain locked in place.

High winds will back-drive the rotary actuator one way or the other, depending, among other things, on the direction of the wind and any upstream obstacles that affect the wind flow. Back-flow of hydraulic fluid will not occur simultaneously out of ports 25 and 30. This allows us to configure the hydraulic system to enable locking of the actuator when high winds create high internal pressures in the actuator.

For example, if a wind is blowing that would tend to twist a parabolic trough collector that is being controlled by the through-shaft 10 of actuator 1 rotating in a CCW direction, and the wind speed becomes dangerously high (e.g., 80 mph), the wind pressures exerted upon the solar collectors creates a large rotational force that must be resisted by the actuator 1. The large overturning moment in the counterclockwise direction on the collector, which is in stow position, causes high pressure to develop within actuator 1 as the hydraulic fluid in actuator 1 is compressed by wind-induced torque. For example, under these high wind conditions, a pressure of about 6000 psi might result within actuator 1 on one side of actuator piston 20 (see FIG. 1). The other side of actuator piston 20 will not experience high pressure. It is in this one-sided pressure situation within actuator 1, when high winds are creating the pressure, that actuator 1 should stay locked in place. It is not desirable under these conditions to have actuator 1 relieve the internal fluid pressure.

However, there are circumstances when it is desirable for actuator 1 to relieve high internal fluid pressures. For example high outdoor ambient temperatures can cause expansion of the hydraulic fluid and create high internal pressure within actuator 1. If the pressure gets too high, e.g., greater than about 7000 psi, generally caused by temperature increases during lengthy periods when the fluid is locked in the actuator 1, such as overnight or during daytime periods when the actuator is not operating (for example if the unit is out of service), the high pressure can damage actuator 1, for example by damaging internal pressure seals or even cracking the actuator housing 15 (FIG. 1), and the like. To prevent this from occurring, the high internal pressures that are caused by temperature-induced expansion of the hydraulic fluid need to be relieved, for example through a valve. The high-temperature condition is detected by first pressure sensor 72 operating to sense the pressure from first port 25 on one side of actuator 1 and send a first pressure signal 80 to a processor 130 (shown in FIG. 5) and the high-temperature condition is also detected by second pressure sensor 74 operating to sense the pressure from second port 30 on the other side of actuator 1 and send a second pressure signal 82 to the processor. When first and second pressure signals 80 and 82 indicate that a threshold pressure (a pressure that is approaching a level that is likely to damage the actuator), has been reached or surpassed in both first and second hydraulic lines 64 and 66, the processor is programmed to send solenoid valve signal 88 to solenoid valve 76, causing it to open to relieve the pressure in actuator 1.

Only when the pressures detected by both first and second pressure sensors 72 and 74 are at or above the threshold pressure will solenoid valve signal 88 be sent to solenoid valve 76 providing for relief of the pressure in actuator 1. In the event of a significant outdoor temperature rise, causing expansion of the hydraulic fluid and thereby creating high internal pressures in actuator 1, the internal pressures will increase on both sides of piston 20 (FIGS. 1, 2 and 3), not just one side, since actuator 1 is a single, integrated component and will heat up substantially the same amount throughout its bulk.

The processor is also programmed to close solenoid valve 76 when the pressure has fallen to a pressure well below the level that would cause damage to actuator 1.

Optional pressure relief valve 78 is a safety feature. It guards against accidental or erroneous pressure relief due to accidental or erroneous transmission of a solenoid valve signal 88 to solenoid valve 76. For example, sometimes when electronic equipment is first powered up, it will send short-burst signals. Should this occur and a short, erroneous solenoid valve signal 88 be sent to solenoid valve 76, it is not desirable to have the hydraulic fluid be sent to the hydraulic fluid reservoir. Pressure relief valve 78 guards against this because it opens only when it directly detects high pressure, e.g., 4500 psi or higher. When solenoid valve signal 88 is legitimate, i.e., due to very high pressures detected by both first and second pressure sensors 72 and 74, solenoid valve 76 will open and pressure relief valve 78 will also open when it experiences high fluid pressure coming through solenoid valve 76. But if an erroneous solenoid valve signal 88 opens solenoid valve 76, when the pressure is low, e.g., below about 3500 psi, pressure relief valve 78 will not open and the hydraulic fluid will not be directed to the reservoir.

Thus a system and method of relieving high pressures due to thermal expansion of the hydraulic fluid has been provided, while also ensuring that pressure relief does not occur when high winds are the cause of high internal actuator pressure.

Figure 5:
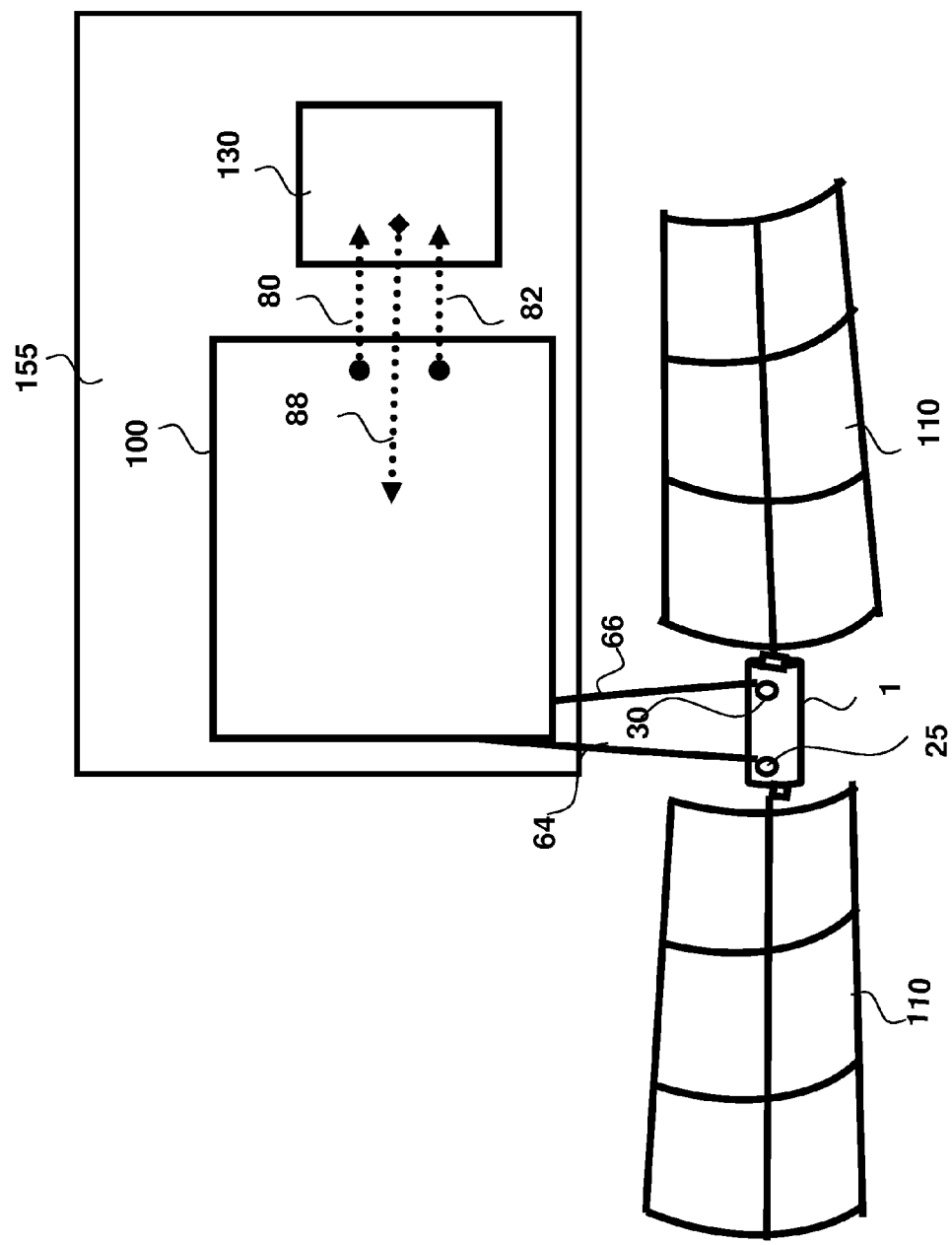
FIG. 5 is a schematic diagram showing the system hereof as used to rotate a parabolic trough collector.

FIG. 5 is a schematic diagram showing the system hereof as used to rotate two parabolic trough collectors 110 to enable them to track the movement of the sun across the sky. First and second hydraulic pressure lines 64 and 66 enter rotary actuator 1 through first and second ports 25 and 30, respectively, and are connected to hydraulic control system components 100. The control system components 100 and the processor 130 are comprised within a control system 155 such as that described in U.S. patent application Ser. No. 12/353,194 for "Sun-Tracking Controller for Multiple Solar Collectors" filed Jan. 13, 2009, which is incorporated herein by reference to the extent not inconsistent herewith for purposes of written description and enablement. Hydraulic control system components 100 are in signal communication with processor 130, as described above with respect to FIG. 4, via first and second pressure signals 80 and 82, and solenoid valve signal 88. Central through-shaft 10 (see FIGS. 1, 2 and 3) of rotary actuator 1 is operationally connected to parabolic trough solar collectors 110.

Figure 6:
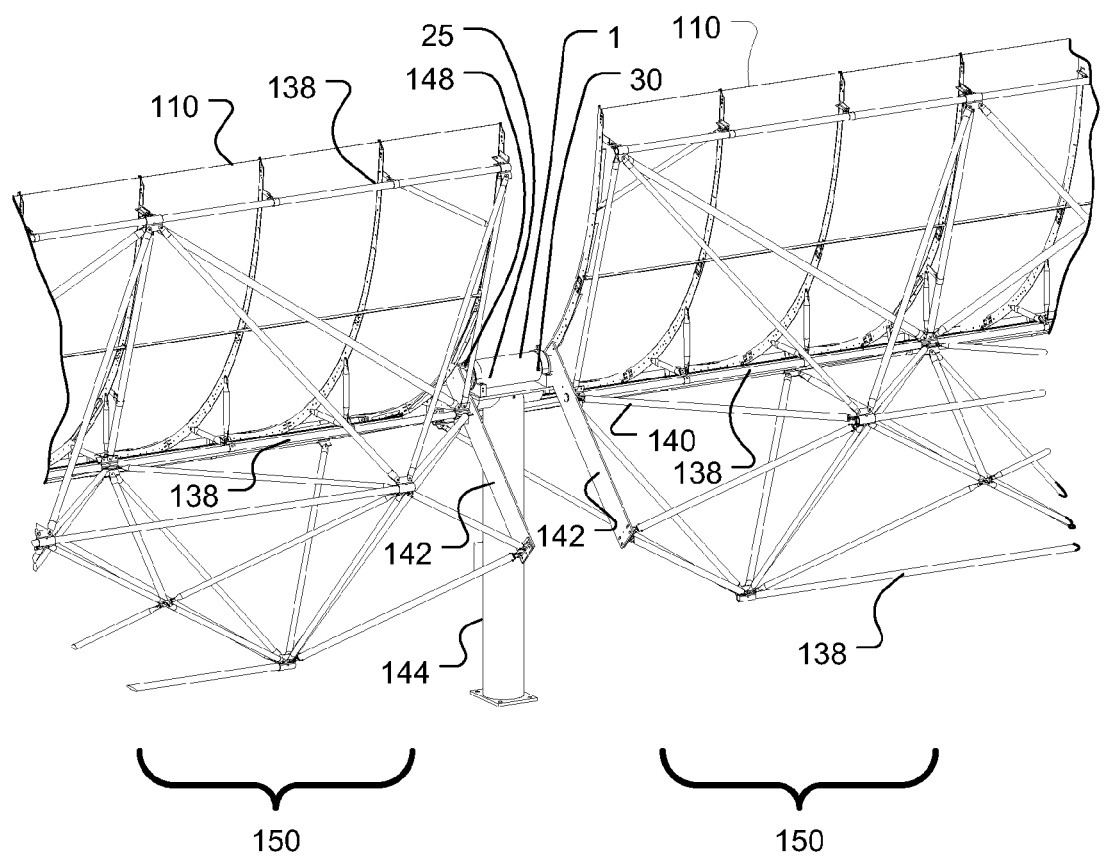
FIG. 6 is a perspective view of an actuator hereof installed on a space frame supporting large parabolic trough solar collectors.
Figure 7:
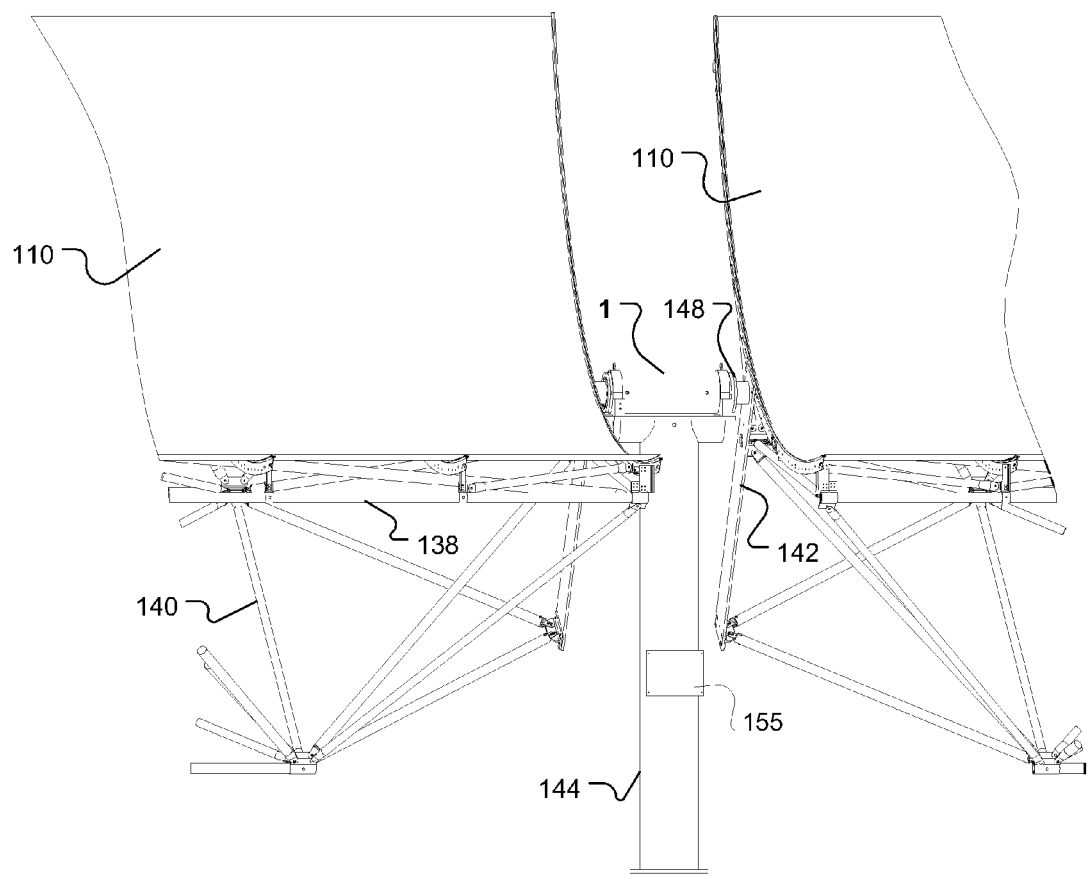
FIG. 7 is a closer view of the actuator, space frame and parabolic trough solar collectors shown in FIG. 6.
Figure 8:
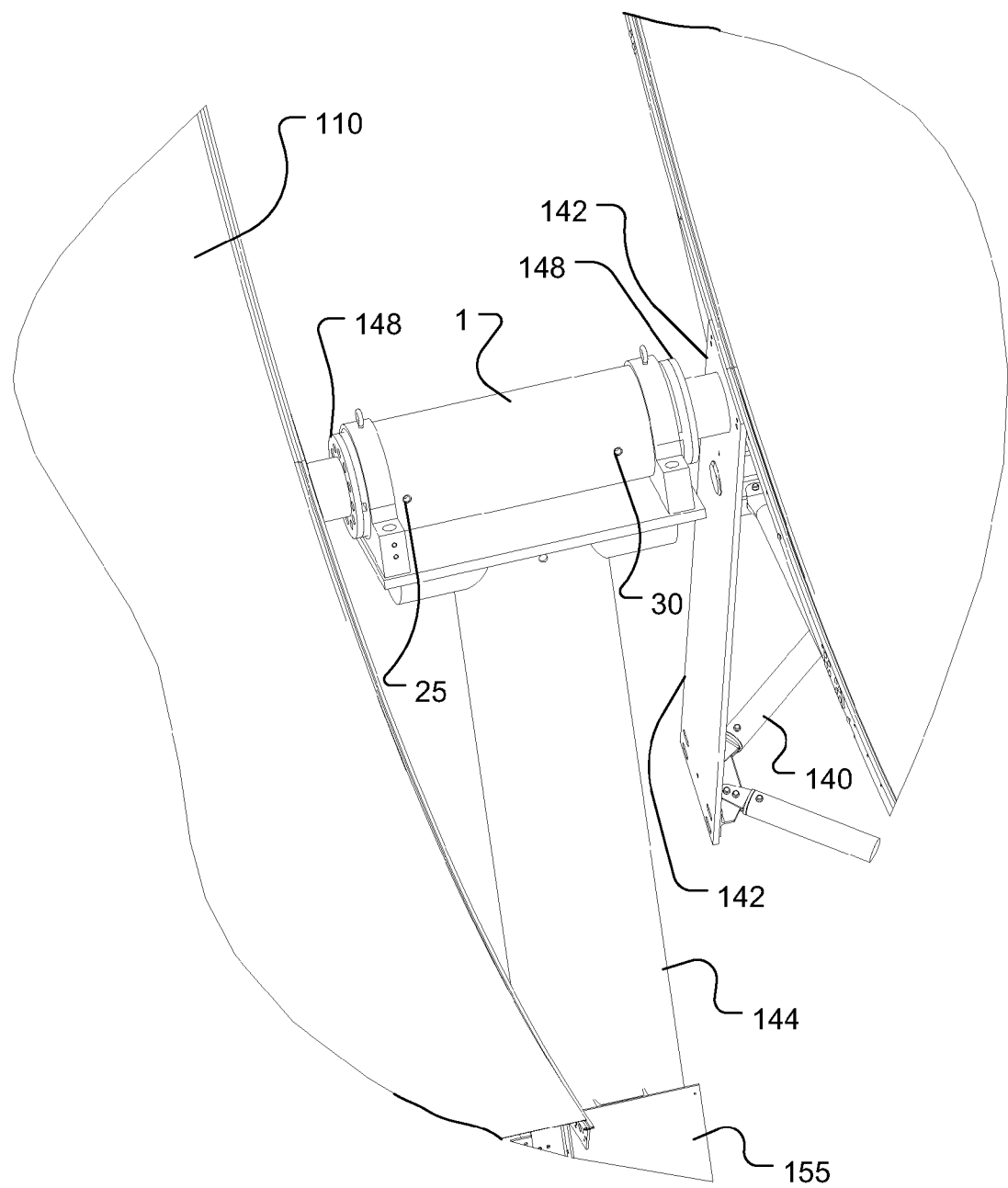
FIG. 8 is a still closer view of the actuator, space frame and parabolic trough solar collectors shown in FIG. 6.

In operation, rotary actuator 1 is operated via the hydraulic control system as described above with respect to FIG. 4, to produce a torque on central through-shaft 10, to cause it to rotate parabolic trough solar collectors 110. When pressure is detected in both first and second hydraulic lines 64 and 66 by first and second pressure sensors 72 and 74 respectively, first and second pressure sensors 72 and 74 send signals 80 and 82 respectively to processor 130, which then sends solenoid valve signal 88 to solenoid valve 76 (FIG. 4) to cause it to open and allow relief of pressure. This pressure relief allows excess hydraulic fluid, created by thermal expansion, to be removed from actuator 1 to prevent damage to the system. This release of high pressure hydraulic fluid from the actuator 1 through second port 30 and through solenoid valve 76 and optional pressure relief valve 78, will result in a small rotation of the through-shaft 10 since the pressure on one side of the piston 20 will be very high, creating a force imbalance within actuator 1 that is resolved by the small rotation, which evens the pressure on both sides of piston 20. Once the pressure in actuator 1 has been reduced below the set-point pressure (e.g., well below 4500 psi) which has been programmed into processor 130, as indicated by pressure signal 82, solenoid valve 76 is instructed to close by processor 130. FIGS. 6, 7 and 8 are increasingly close-up perspective views of an actuator 1 hereof installed on a support stand 144 (also referred to as a "pylon"), which also supports space frames 150. Space frames 150 in turn support large parabolic trough solar collectors 110. A control system 155 attached to support stand 144 controls the movement of actuator 1. Space frame 150 is made up of axial chords 138 and oblique struts 140, for example as described in U.S. Provisional Patent Application No. 61/079,382, filed Jul. 9, 2008, and U.S. patent application Ser. No. 12/500,467, filed Jul. 9, 22, 2009, both of which are incorporated herein by reference to the extent not inconsistent herewith for purposes of enablement and written description. The through-shaft 10 (see FIG. 1) of Actuator 1 is fixedly attached at both ends to rotating flanges 148 which are in turn fixedly attached to torque plates 142, which are fixedly attached to collectors 110, such that rotation of through shaft 10 causes rotation of collectors 110. Actuator 1 is operationally connected via first and second hydraulic pressure lines 64 and 66 (shown in FIGS. 4-5) entering actuator 1 through ports 25 and 30, respectively, to control system components 100 and 130 (FIG. 5).

Figure 9:
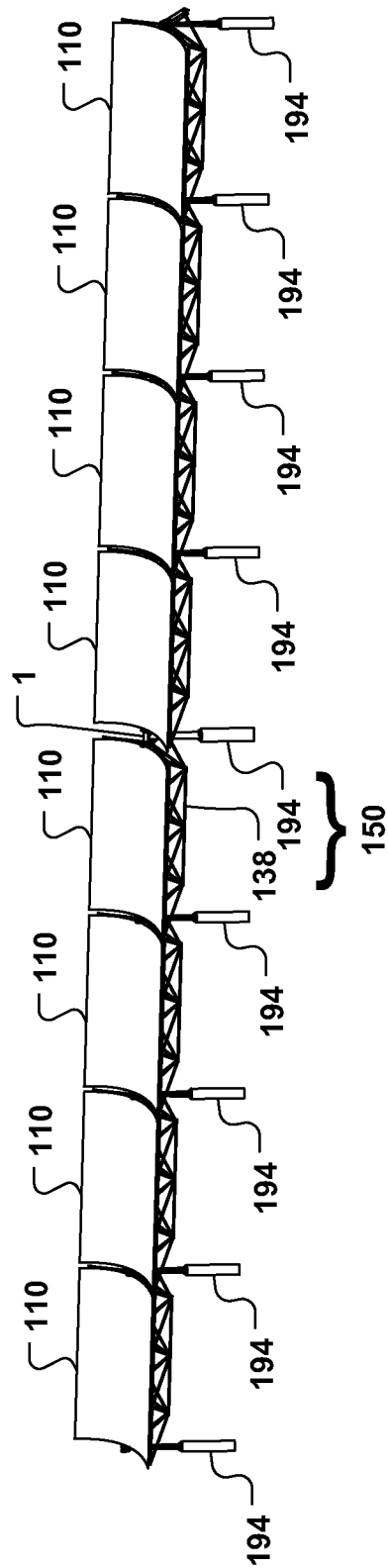
FIG. 9 is a perspective view of eight large parabolic solar collectors operated by a single actuator.

FIG. 9 is a perspective view of eight large parabolic solar collectors 110 operated by a single actuator 1. The figure shows support stands 144 and space frames 150 supporting solar collectors 110 and actuator 1.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A rotational actuator system for controlling rotation of a solar collector, said system comprising:
   a bi-directional motor that establishes a flow direction of hydraulic fluid to cause rotation of a bi-directional rotational actuator through an arc substantially perpendicular to a plane of the ground, wherein the arc has a selected upper limit of about 180 degrees to about 240 degrees;
   a control system hydraulically connected to said actuator for controlling rotation of the solar collector along the arc in either a clockwise or counter-clockwise direction depending on the flow direction of the hydraulic fluid from the bi-directional motor; wherein the control system and the actuator are connected by a closed-loop hydraulic circuit comprising first and second hydraulic lines;

first and second pressure sensors for individually monitoring said first and second hydraulic lines; and a solenoid valve that is opened in response to dual pressure signals from both said first and second pressure sensors.

2. The actuator system of claim 1 also comprising at least one additional solar collector operationally connected to said actuator.

3. The actuator system of claim 1 also comprising:
means for causing said actuator to rotate the attached solar collector into stow position under high wind conditions.

4. The system of claim 1 wherein said actuator is capable of exerting between about 250,000 in-lb of torque and about 750,000 in-lb of torque.

5. The system of claim 1 wherein said rotational actuator comprises:
a through-shaft having first and second ends and comprising first helical gear teeth;
a piston having an inner circumference comprising second helical gear teeth configured to mesh with said first helical gear teeth; and an outer circumference comprising third helical gear teeth;
a housing at least partially surrounding said through-shaft and said piston, said housing having an inner surface comprising fourth helical gear teeth configured to mesh with said third helical gear teeth;
a first port through said housing for receiving hydraulic fluid, said first port being positioned such that pressure from hydraulic fluid introduced into said housing through said first port causes said piston to move in a first direction away from said first port; and
a second port for receiving hydraulic fluid; said second port being positioned such that pressure from hydraulic fluid introduced into said housing through said second port causes said piston to move in a second direction away from said second port;
whereby when hydraulic fluid is entering said actuator through said first port, said through-shaft rotates in a first direction and when hydraulic fluid is entering said actuator though said second port, said through-shaft rotates in a second direction; and when no hydraulic fluid is entering said actuator, said actuator is locked such that said through-shaft does not rotate.

6. The system of claim 5 also comprising:
said first and second hydraulic pressure lines operationally connected to said actuator through first and second ports; and
a bi-directional motor and pump connected to said first and second hydraulic pressure lines.

7. The system of claim 1 also comprising means for relieving pressure in said system under high temperature conditions, such that said actuator is not damaged by high pressure.

8. The system of claim 7 wherein said means for relieving pressure in said system and allowing it to function during high temperature conditions comprise:
a pressure relief line operationally connected to said actuator;
first and second pressure sensors respectively operationally connected to a computer processor capable of receiving said dual pressure signals from said first and second pressure sensors, and capable of sending a solenoid valve control signal in response to said pressure signals; and
said solenoid valve in operational connection to said pressure relief line capable of receiving said solenoid valve control signal from said processor;
whereby said control signal from said processor opens or closes said solenoid valve.

9. The system of claim 8 wherein said processor is programmed to send said solenoid valve control signal causing said solenoid valve to open when it receives a pressure signal indicating pressures at or above a first selected value from both of said pressure sensors.

10. The system of claim 9 wherein said first selected value is about 6000 psi.

11. The system of claim 8 wherein said processor is programmed to send a signal to said solenoid valve causing it to close when it receives pressure signals from said pressure sensors indicating pressures at or below a second selected value.

12. The system of claim 11 wherein said second selected value is about 4500 psi.

13. The system of claim 8 also comprising a pressure relief valve operationally connected to said pressure relief line.

14. A method of making a rotational actuator system for controlling rotation of a solar collector, said method comprising:
providing a bi-directional motor that establishes a flow direction of hydraulic fluid to cause rotation of a bi-directional hydraulic rotational actuator along an arc substantially perpendicular to a plane of the ground, wherein the bi-directional motor and actuator are capable of exerting enough torque to rotate at least one solar collector through the arc having a selected upper limit of about 180 degrees to about 240 degrees;
providing a control system for controlling operation of said actuator; and
hydraulically connecting said control system to said actuator in a closed-loop hydraulic circuit comprising first and second hydraulic lines;
providing first and second pressure sensors for individually monitoring said first and second hydraulic lines; and
providing a solenoid valve that is opened in response to dual pressure signals from both said first and second pressure sensors.

15. The method of claim 14 also comprising connecting to the actuator automatic means for preventing said actuator from being damaged by high pressures caused by high temperature conditions.

16. The method of claim 14 wherein said actuator comprises:
a through-shaft having first and second ends and comprising first helical gear teeth;
a piston having an inner circumference comprising second helical gear teeth configured to mesh with said first helical gear teeth; and an outer circumference comprising third helical gear teeth;
a housing at least partially surrounding said through-shaft and said piston, said housing having an inner surface comprising fourth helical gear teeth configured to mesh with said third helical gear teeth;
a first port through said housing for receiving hydraulic fluid, said first port being positioned such that pressure from hydraulic fluid introduced into said housing through said first port causes said piston to move in a first direction away from said first port; and
a second port for receiving hydraulic fluid; said second port being positioned such that pressure from hydraulic fluid introduced into said housing through said second port causes said piston to move in a second direction away from said second port;
whereby when hydraulic fluid is entering said actuator through said first port, said through-shaft rotates in a first direction and when hydraulic fluid is entering said actuator though said second port, said through-shaft rotates in a second direction; and when no hydraulic fluid is entering said actuator, said actuator is locked such that said through-shaft does not rotate.

17. The system of claim 1, wherein said actuator comprises helical gearing.

* * * * *

UNITED STATES PATENT AND TRADEMARK OFFICE
CERTIFICATE OF CORRECTION

PATENT NO.         : 8,904,774 B2
APPLICATION NO.    : 12/544910
DATED              : December 9, 2014
INVENTOR(S)        : Randall C. Gee It is certified that error appears in the above-identified patent and that said Letters Patent is hereby corrected as shown below:

In the Claims

In Claim 8, column 13, lines 55 through 67, replace
"a pressure relief line operationally connected to said actuator;
first and second pressure sensors respectively operationally connected to a computer processor capable of receiving said dual pressure signals from said first and second pressure sensors, and capable of sending a solenoid valve control signal in response to said pressure signals; and
said solenoid valve in operational connection to said pressure relief line capable of receiving said solenoid valve control signal from said processor;
whereby said control signal from said processor opens or closes said solenoid valve." with -- a pressure relief line operationally connected to said actuator;
a computer processor capable of receiving said dual pressure signals from said first and second pressure sensors, and capable of sending a solenoid valve control signal in response to said pressure signals; and
said solenoid valve in operational connection to said pressure relief line capable of receiving said solenoid valve control signal from said processor;
whereby said control signal from said processor opens or closes said solenoid valve. --

Signed and Sealed this
Sixteenth Day of June, 2015

Michelle K. Lee
*Director of the United States Patent and Trademark Office*